(12) United States Patent
Li et al.

(10) Patent No.: US 12,466,274 B2
(45) Date of Patent: Nov. 11, 2025

(54) LOCOMOTIVE WIRELESS MULTI-HEADING REMOTE DISTRIBUTED POWER TRACTION OPERATION CONTROL SYSTEM, AND MULTI-HEADING LOCOMOTIVE

(71) Applicants: CENTRAL SOUTH UNIVERSITY, Hunan (CN); NATIONAL RAILWAY ADMINISTRATION EQUIPMENT TECHNOLOGY CENTER, Beijing (CN); SCIENCE AND TECHNOLOGY RESEARCH INSTITUTE OF DAQIN RAILWAY CO., LTD, Shanxi (CN); CHANGSHA NANRUI RAIL TRANSPORT ELECTRIC EQUIPMENT CO., LTD, Hunan (CN)

(72) Inventors: Wei Li, Hunan (CN); Xiang Wei, Taiyuan Shanxi (CN); Yongsheng Yu, Taiyuan Shanxi (CN); Songxu Wang, Beijing (CN); Zhijian Liu, Taiyuan Shanxi (CN); Meiqi Yao, Changsha Hunan (CN); Kai Wang, Hunan (CN); Wenlu Zhang, Hunan (CN); Ting Li, Hunan (CN)

(73) Assignees: Central South University, Changsha (CN); National Railway Administration Equipment Technology Center;, Beijing (CN); Science and Technology Research Institute of Daqin Railway Co., Ltd, Taiyuan (CN); Changsha Nanrui Rail Transport Electric Equipment Co., Ltd, Changsha (CN)

( * ) Notice: Subject to any disclaimer, the term of this patent is extended or adjusted under 35 U.S.C. 154(b) by 6 days.

(21) Appl. No.: 18/577,240

(22) PCT Filed: Aug. 1, 2022

(86) PCT No.: PCT/CN2022/109402
§ 371 (c)(1),
(2) Date: Jan. 5, 2024

(87) PCT Pub. No.: WO2023/029852
PCT Pub. Date: Mar. 9, 2023

(65) Prior Publication Data
US 2024/0351451 A1    Oct. 24, 2024

(30) Foreign Application Priority Data

Sep. 3, 2021    (CN) .......................... 202111034051.2

(51) Int. Cl.
*B60L 15/38*    (2006.01)
*B61L 15/00*    (2006.01)

(52) U.S. Cl.
CPC ........... *B60L 15/38* (2013.01); *B61L 15/0063* (2013.01); *B61L 15/0072* (2013.01)

(58) Field of Classification Search
CPC ...... B60L 15/38; B60L 3/0084; B60L 3/0092; B60L 2200/26; B60L 2250/12;
(Continued)

(56) References Cited

U.S. PATENT DOCUMENTS 7,034,476 B2 *   4/2006   Wang ..................... B60L 15/10
                                                     318/432
10,250,300 B1 *   4/2019   Pinkerton .............. G01K 1/024
(Continued)

FOREIGN PATENT DOCUMENTS

CN    101654113 A    2/2010
CN    103754229 A    4/2014
(Continued)

OTHER PUBLICATIONS

International Search Report and Written Opinion, dated Oct. 28, 2022, for International Application No. PCT/CN2022/109402, 12 pages.

*Primary Examiner* — Joseph J Dallo
(74) *Attorney, Agent, or Firm* — MASCHOFF BRENNAN; Michael Mauriel; Elaine K. Lee (57) ABSTRACT

A locomotive wireless multi-heading remote distributed power traction operation control system. A set of differential
(Continued)

multi-heading control unit (8) is added to a train control and management system of an original locomotive, and is combined and fused with a train control and management system (21), a brake control unit (24), a train safety monitoring device (20), a locomotive logic control unit (23), and a locomotive third-party device (25) to implement wireless multi-heading distributed power traction control operation of locomotives in a heavy haul combined train, and adapt to train multi-heading traction control operation of differential locomotives of a heavy haul combined train or multi-heading operation of different railway locomotives. Also provided is a multi-heading locomotive.

8 Claims, 6 Drawing Sheets

(58) Field of Classification Search
CPC ...... B60L 15/34; B60L 15/36; B61L 15/0063; B61L 15/0072; B61L 15/0027; B61L 15/0036; B61L 15/0081; B61L 25/028; B61B 1/005; B61C 3/00; B61C 17/12; G05B 19/418; H04W 4/40; Y02P 90/02
See application file for complete search history.

(56) References Cited

U.S. PATENT DOCUMENTS

| | | | | |
|---|---|---|---|---|
| 2009/0118970 A1* | 5/2009 | Daum | ................ | B61L 15/0058 701/102 |
| 2011/0075641 A1* | 3/2011 | Siriwongpairat | ....... | H04W 4/12 370/337 |
| 2019/0054936 A1 | 2/2019 | Tione et al. | | |
| 2020/0023870 A1* | 1/2020 | Mansfield | ............... | G01S 3/043 |
| 2020/0084176 A1* | 3/2020 | Wolf | ................... | B61L 15/0027 |
| 2022/0044183 A1* | 2/2022 | Jordan | ................ | G06Q 30/018 |

FOREIGN PATENT DOCUMENTS

| | | | | | |
|---|---|---|---|---|---|
| CN | 104925071 A | | 9/2015 | | |
| CN | 109664917 A | | 4/2019 | | |
| CN | 113942544 A | * | 1/2022 | .............. | B60L 15/34 |
| CN | 2023029852 A | | 3/2023 | | |
| WO | WO-2005036199 A2 | * | 4/2005 | .............. | B61K 9/08 |
| WO | WO-2013155437 A1 | * | 10/2013 | .............. | G01B 21/02 |
| WO | WO-2022134686 A1 | * | 6/2022 | .............. | B61L 15/00 |
| WO | WO-2023002232 A1 | * | 1/2023 | .............. | B60L 1/006 |
| WO | WO-2023029852 A1 | * | 3/2023 | .............. | B60L 15/34 |

* cited by examiner

LOCOMOTIVE WIRELESS MULTI-HEADING REMOTE DISTRIBUTED POWER TRACTION OPERATION CONTROL SYSTEM, AND MULTI-HEADING LOCOMOTIVE

CROSS REFERENCE TO RELATED APPLICATIONS

This application is a U.S. National Phase application under 35 U.S.C. § 371 of International Application No. PCT/CN2022/109402 filed on Aug. 1, 2022 and claims priority to Chinese Application No. 202111034051.2 filed on Sep. 3, 2021.

FIELD OF THE INVENTION

The present invention relates to high-speed railway technology, in particular to a locomotive wireless multi-heading remote distributed power traction operation control system and a multi-heading locomotive.

BACKGROUND OF THE INVENTION

High speed and heavy haul are two main directions of railway development. With the development of high-speed railway technology, heavy haul railway technology and equipment have also received increasing attention. Existing technologies lack adaptability to different models of HXD1 and HXD2 heavy haul electric locomotives. Poor application adaptability to locomotives installed with different types of TCMS systems and different types of synchronous control multi-heading control devices cannot well satisfy implementation and application of a locomotive wireless multi-heading remote distributed power traction operation function under heavy haul combinations.

SUMMARY OF THE INVENTION

Aiming at the shortcomings of the existing technologies, the technical problem to be solved by the present invention is to provide a locomotive wireless multi-heading remote distributed power traction operation control system and a multi-heading locomotive. On the basis of implementing wireless multi-heading remote distributed power traction operation control on locomotives of a heavy haul combined train, the system satisfies optimization of longitudinal force performance of the train.

To solve the above technical problem, the technical solution adopted by the present invention is as follows:

A locomotive wireless multi-heading remote distribution power traction operation control system includes at least one differential multi-heading control unit disposed on each locomotive; the differential multi-heading control units on a plurality of locomotives form a two-stage architecture, where the first stage is a cloud differential locomotive wireless multi-heading management stage, at which the differential multi-heading control units of locomotives constitute a virtual differential wireless multi-heading management system through wireless communication and wired communication, the differential multi-heading control units are initialized after the locomotives are marshaled, a topology table of the differential multi-heading control units is built, and the differential multi-heading control unit of a master locomotive has a management authority and manages each differential multi-heading control unit according to the topology table; and the second stage is a differential locomotive wireless multi-heading control stage, at which the wireless multi-heading control unit of each locomotive obtains control information of the locomotive, state feedback information of the locomotive, operation line data information, and wireless communication information through bus data sharing, and the differential multi-heading control unit of the master locomotive calculates and processes the control information of the locomotive, the state feedback information of the locomotive, the operation line data information, and the wireless communication information. This calculation process is mainly carried out on each locomotive, and the master and slave locomotives adapt to a bus topology according to their own traction characteristics. At the second stage, a core module DMU calculation and cooperative control module performs cooperative control on a static logic and a dynamic sequential logic of the locomotives through a locomotive differential control module, to fuse the static logic and the dynamic sequential logic, and a state of a state machine is used as a trigger condition for logic control transfer to transfer logic control. In addition, a traction/brake characteristic control module implements real-time secondary distribution and adjustment of locomotive traction characteristics through a set locomotive traction characteristic curve, and implements coefficient correction according to a speed set by a driver or a magnitude of traction/brake force, so as to reduce longitudinal force of a train and simplify control logic; a fault safety guide module provides active protection; finally, a DMU calculation and cooperative control module implements control correction and cooperative control of each locomotive, and exchanges information with the differential multi-heading control unit of each slave locomotive; and at the same time, the differential multi-heading control unit of each locomotive adjusts the traction/brake force of the locomotive through a locomotive control system TCMS and an electrical interface.

In the present invention, a differential multi-heading control unit DMU is added to an original heavy haul locomotive and fused into a train control and management system of the locomotive, thereby quickly upgrading and transforming heavy haul electric locomotives equipped with different systems, effectively and stably establishing remote multi-heading of multi-heading locomotives, achieving remote distributed power traction operation of a heavy haul combined train, reducing upgrade and maintenance costs, and optimizing longitudinal dynamic performance of the train.

The differential locomotive wireless multi-heading control stage communicates with the locomotive control system TCMS of multi-heading locomotives; and the locomotive control system TCMS completes input/output and control of a locomotive electrical system by receiving instructions from the differential locomotive wireless multi-heading control stage. The present invention can collect and drive electrical signals of different electrical levels on different locomotives without additional adaptive conversion circuits and equipment. Unlike distributed input/output interfaces for general locomotives, the differential locomotive wireless multi-heading control stage uses a centralized input/output interface, and both collection and driving are performed on the same device. That is, for the locomotive differential electrical system, the present invention implements normalization on the control logic, thereby reducing complexity of system design and further improving reliability of the collection and driving.

The differential locomotive wireless multi-heading control stage exchanges information with the locomotive control system TCMS through a vehicle wired communication network. The differential locomotive wireless multi-heading control stage can adapt to different TCMS buses on multiple types of locomotives. Existing TCMS wired communication networks are diverse, with complex and greatly different communication protocols. The differential locomotive wireless multi-heading control stage automatically extracts effective key data by integrating multiple vehicle communication interfaces, to achieve the goal of quickly adapting to TCMS locomotive buses without additional external communication gateways. The information exchange between differential locomotive wireless multi-heading control stage and the TCMS are bidirectionally synchronized, and the operation states are monitored mutually, thereby meeting real-time data requirements and ensuring data safety.

The cloud differential locomotive wireless multi-heading management stage includes:
  a DMU networking and management module, configured to implement real-time and periodic exchange of air data between a plurality of locomotives;
  a differentially adaptive cloud management module, configured to form a group topology table for control applications between the locomotives, translate, based on a data application of a communication platform, control and feedback information into a unified information mode at a cloud for the differentiation of the locomotives, check whether the traction characteristics of the locomotives meet traction requirements of a heavy haul train, check whether the distribution of the locomotives in the train reasonably meets dynamics performance requirements of the train, and match weights of traction/brake characteristics according to the differentiation of the locomotives;
  a wireless link management module, configured to build real-time communication between the remote locomotives, form communication link management for group control applications between the locomotives, perform data error verification, and perform conversion and control of a link management authority; and
  a safe transmission management module, configured to add, based on safety effectiveness of an original link layer, a safety protocol to an original transparent transmission mode on a software application layer through optimization of a locomotive communication protocol, so that each frame of data is encrypted during encoding, and even if the data is monitored during transmission, data safety will not be affected and safe data transmission is implemented.

The cloud differential locomotive wireless multi-heading management stage adopts a cloud computing server architecture to unify wireless multi-heading locomotive control and calculation onto a cloud processing computing platform, which can fully evert computing power of a cloud server, reduce requirements of the control system of the locomotive for the computing power, reduce mounting space of locomotive equipment, and improve a safety level of on-board control. The locomotive wireless multi-heading equipment completes normalization on differential data of the locomotive, and then the cloud differential locomotive wireless multi-heading management completes unified cooperative calculation, so that the computing rhythm is kept consistent, exchanged data can be processed and transmitted simultaneously, the response speed of locomotive instructions is improved, and a safety impact caused by a computing delay is eliminated.

The differential locomotive wireless multi-heading control stage includes:
  a DMU calculation and cooperative control module, configured to implement asynchronous cooperative traction operation control under remote multi-heading of the locomotives;
  a wireless communication data transmission module, configured to complete data exchange with the wireless link management module and communicate with a redundancy management module;
  the redundancy management module, configured to implement authority management of two DMUs in the same locomotive, where the DMU that obtains a master control authority has an external output function, while the other is automatically converted into a redundancy module, does not have the external output function, and has the same information input and calculation functions as the master DMU. At the same time, the redundancy module has a function of monitoring the master DMU. Once the master DMU is abnormal, the master DMU automatically loses a master control token, and the redundancy management module in the redundancy DMU automatically obtains the token and is upgraded to a master module;
  a locomotive differential control module, configured to implement locomotive control for different types of locomotives and different control modes, and communicate with the DMU calculation and cooperative control module and an electrical driving control module;
  a traction/brake characteristic control module, since the master locomotive and the slave locomotives are different in models, their traction/brake control characteristics and operating conditions of locomotives on a line are also different, especially when running on long and large rolling ramps and running through electrical phase separation, the traction/brake characteristics of locomotives distributed at different positions in the train need to be adjusted. In this regard, the traction/brake characteristic control module in the present invention matches traction/brake characteristic weight coefficients according to different locomotive models, distribution positions of locomotives in different trains, different line conditions, different locomotive operating conditions, and the differentiation of the locomotives, adjusts the traction/brake characteristics of each locomotive according to instructions of a driver controller of the master locomotive, and calculates and controls the traction/brake characteristics of the locomotives in real time, so as to reduce longitudinal force of the train and optimize train operation quality;
  a fault safety guide control module, configured to implement fault diagnosis and safety guide for locomotive multi-heading, and communicate with the DMU calculation and cooperative control module and the electrical driving control module;
  the electrical driving control module, configured to implement signal driving of the locomotive control system TCMS, a BCU brake control unit, and an LCU logic control unit, and communicate with the redundancy management module; and
  a communication interface module, configured to communicate with the TCMS system, the BCU brake control unit, the LCU logic control unit, an LKJ train operation safety monitoring apparatus, and third-party devices, and communicate with the DMU calculation and cooperative control module and the electrical driving control module.

The differential locomotive wireless multi-heading control stage has control objectives of locomotive traction, brake and safety guide, and can quickly, effectively and stably establish interconnection between locomotives, including interconnection and multi-heading between different models of locomotives, so as to build an efficient and real-time control foundation for cloud differential locomotive wireless multi-heading management of the previous stage. Through the platform-based DMU control unit, multiple types of communication interfaces and electrical collection driving circuits are integrated, which can be compatible with wireless multi-heading and marshaling of multiple types of differential locomotives without additional adapter equipment, wireless multi-heading traction operations of a plurality of differential locomotives are controlled through dynamic performance optimization, and system reliability is guaranteed by using a redundancy mechanism.

The present invention further provides a multi-heading locomotive, which uses the foregoing locomotive wireless multi-heading remote distributed power traction operation control system.

In the present invention, each locomotive includes two compartments, and each compartment is provided with a differential multi-heading control unit; or each locomotive includes three compartments, where unit sections of two cabs are provided with the differential multi-heading control units; and the two differential multi-heading control units on the same locomotive communicate with each other.

Compared with the existing technologies, the beneficial effects of the present invention are as follows: A set of simplified differential multi-heading control unit DMU is added to an original heavy haul locomotive and fused into the train control and management system of the locomotive, so that heavy haul electric locomotives equipped with different national systems are quickly upgraded and transformed, remote multi-heading of locomotives is effectively and stably built, remote distributed power traction operation of a heavy haul combined train is implemented, upgrade and maintenance costs are reduced, and longitudinal dynamic performance of the train can be optimized.

DETAILED DESCRIPTION OF THE EMBODIMENTS

For quick upgrade and transformation of different systems of HXD1 and HXD2 heavy haul electric locomotives and compatibility of respective systems, embodiments of the present invention provide a locomotive wireless multi-heading remote distributed power traction operation control system, which satisfies optimization of longitudinal force performance of a train on the basis of implementing wireless multi-heading remote distributed power traction operation control on a plurality of locomotives of a heavy haul combined train and wider development in haul freight intelligent locomotives in the future. In the embodiments of the present invention, an integrated train control and remote multi-heading system based on fusion of a train control and management system TCMS and differential multi-heading control units DMUs is built, only a local area cloud platform for remote distributed power multi-heading control is built for a DMU, input, output and driving are completed by the TCMS, so that minimum DMUs are fused into the TCMS to meet application requirements.

The embodiments of the present invention refer to patents ZL201510388004.6 and ZL201811505275.5 to implement cooperative logic fusion control on each remote locomotive, and refer to embodiments of ZL201510388004.6 and ZL201811505275.5 to implement state machine logic trigger transfer and traction/characteristic weight coefficient matching. In the embodiments of the present invention, a set of simplified differential multi-heading control unit DMU (decision making unit) is added to an original heavy haul locomotive to build an integrated train control and remote multi-heading system based on fusion of a train control and management system TCMS and differential multi-heading control units DMUs, so that heavy haul electric locomotives equipped with different systems are quickly upgraded and transformed, remote multi-heading of locomotives is effectively and stably built, remote distributed power traction operation of a heavy haul combined train is implemented, upgrade and maintenance costs are reduced, and longitudinal dynamic performance of the train is optimized, specifically including the following aspects:

(1) A locomotive wireless multi-heading remote distributed power traction operation control system is built, including two parts: the first part is an existing locomotive network control and management system TCMS. i.e., stage I, and the second part includes differential simplified multi-heading control units DMUs, i.e., stage II. The first part and the second part exchange information through a vehicle communication network. The second part is connected to electrical control systems of locomotives through system input/output, for collection and driving.

(2) A locomotive wireless multi-heading remote distributed power traction operation control system is built, with a simplified DMU part including 12 modules, that is, a DMU networking and management module, a differentially adaptive cloud management module, a wireless link management module, a safety transmission management module, a DMU calculation and cooperative control module, a wireless communication data transmission module, a redundancy management module, a locomotive differential control module, a traction/brake characteristic control module, a fault safety guide control module, an electrical driving control module, and a communication interface module. The DMU wireless link management module performs link management and real-time data transmission for communication between multiple locomotives and builds a local area cloud management platform, the DMU networking and management module implements real-time and periodic exchange of air data between multiple locomotives, and the safety transmission management module ensures safety of data transmission. The differentially adaptive cloud management module matches weight coefficients according to a location and traction power of the train, and corrects the weight coefficients according to line ramp data. The wireless communication data transmission module completes data exchange with the wireless link management module. The traction/brake characteristic control module performs locomotive characteristic control according to operating conditions of a master locomotive and slave locomotives, selects a characteristic control mode, and calculates and controls traction operations of the locomotives in real time. The locomotive differential control module implements locomotive control for different types of locomotives and different control modes. The fault safety guide control module guarantees fault diagnosis and safety guide for locomotive multi-heading. The electrical driving control module implements signal driving for the TCMS, a BCU brake control unit, and an LCU logic control unit. The DMU calculation and cooperative control module implements asynchronous cooperative traction operation control under remote multi-heading of the locomotives. The communication interface module implements communication with the TCMS, the BCU brake control unit, the LCU logic control unit, an LKJ train operation safety monitoring apparatus, and third-party devices. Meanwhile, the communication interface module implements interconnection and communication between a master DMU and a redundant DMU, which implement information exchange and state monitoring of two DMUs in the same locomotive.

(3) In the built locomotive wireless multi-heading remote distributed power traction operation control system, the DMU operates according to operating conditions of the master locomotive and the slave locomotives. The DMU traction/brake characteristic control module receives, according to a locomotive characteristic control strategy and a characteristic control mode, traction/brake characteristic weight matching coefficients transmitted by the differentially adaptive cloud management module, calculates and controls characteristics of the locomotives in real time, and exchanges information with the TCMS through a vehicle wired communication network module.

(4) In the built locomotive wireless multi-heading remote distributed power traction operation control system, the TCMS in the first part still maintains original traction control and management functions when a single locomotive is towing a train. When locomotive multi-heading is performed, the TCMS performs multi-heading mode switching control according to the multi-heading cooperative control of the DMU, a vehicle communication module in the TCMS exchanges information with a communication module of the DMU, and the TCMS performs traction cooperative operation control for locomotive multi-heading, and performs signal driving and collection for the locomotive electrical system through an electrical interface module of the TCMS.

(5) In the built locomotive wireless multi-heading remote distributed power traction operation control system, each compartment is equipped with a DMU, and two DMUs of each locomotive are redundant to each other. In terms of logical building, the system uses a two-stage architecture. The first stage is a cloud differential locomotive wireless multi-heading management stage, at which a multi-unit networking and link management module of each multi-heading locomotive DMU is built through a remote wireless communication module, and constitutes a virtual differential multi-heading control system together with a vehicle communication module of a TCMS system interface; and after the multi-heading locomotives are marshaled, the DMUs are initialized, a topology table of the differential multi-heading control unit is built, and the DMU of the master locomotive has a management authority to manage each DMU. The second stage is a locomotive wireless multi-heading asynchronous cooperative control stage, at which the built differential wireless multi-heading control unit DMU of each locomotive obtains control information and state feedback information of the locomotive through the vehicle communication module in a bus data sharing manner, and obtains operation line data information of an LKJ system through an LKJ communication module of the DMU, followed by differential characteristic adjustment calculation and processing of the master DMU, as well as information exchange between the master DMU and each slave DMU. At the same time, each DMU exchanges information with the TCMS through its communication module to control the adjustment of locomotive traction/brake force.

The locomotive wireless multi-heading remote distributed power traction operation control system may be formed in such a way that a master locomotive remotely controls more than one slave locomotive for asynchronous cooperative control of train distributed power traction operation.

Embodiment 1

Figure 1A:
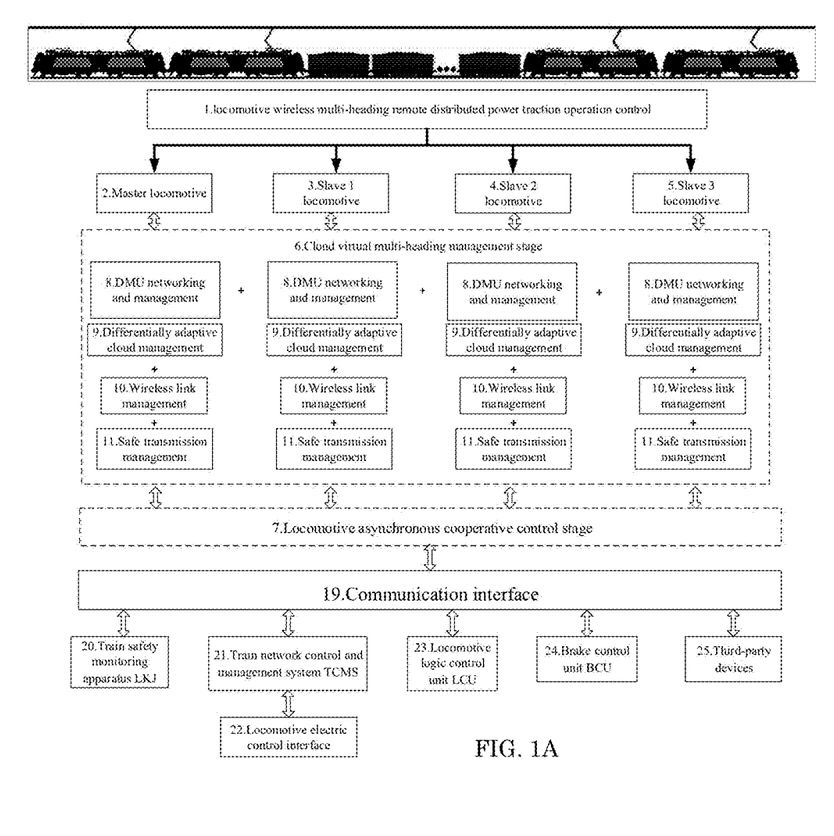
FIGS. 1a and 1b are schematic structural diagrams of a traction operation control system of the present invention.
Figure 1B:
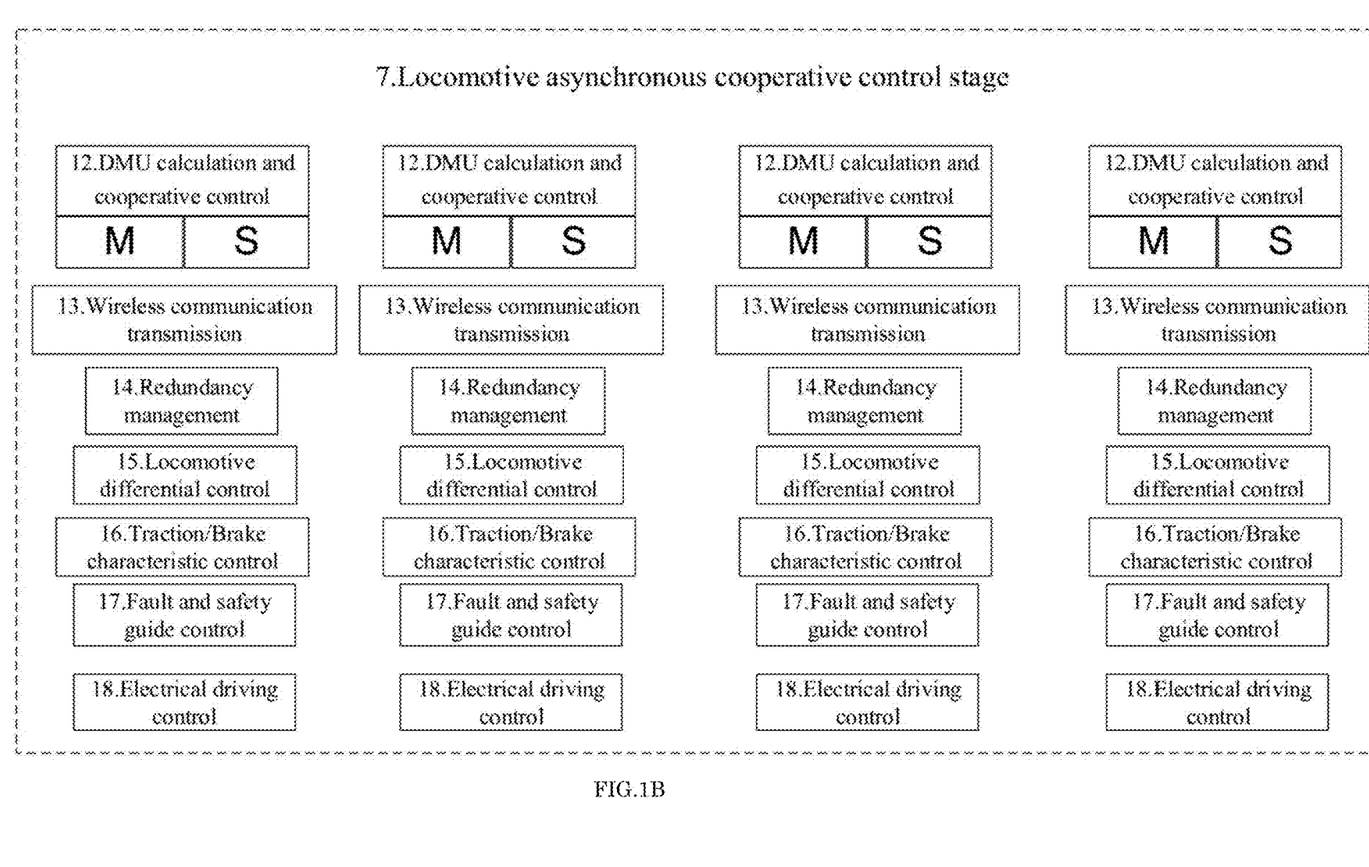
Figure 5:
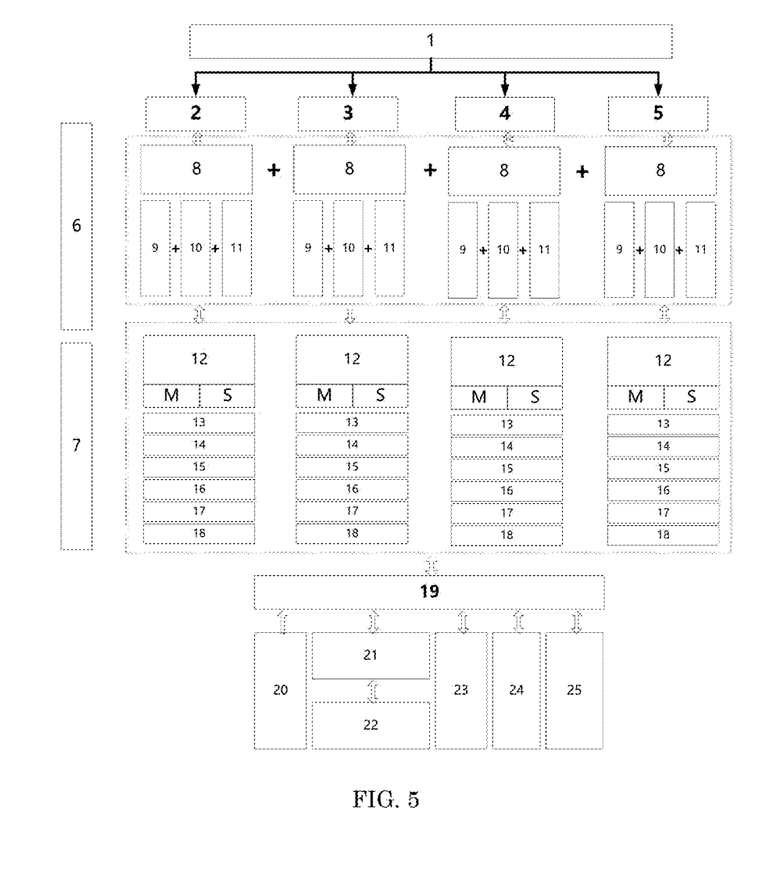
FIG. 5 is a structural block diagram of Embodiment 4 of the present invention.

As shown in FIG. 1 and FIG. 5, in Embodiment 1 of the present invention, a locomotive wireless multi-heading remote distributed power traction operation control system 1 may be built by wireless multi-heading of a master locomotive 2, a slave 1 locomotive 3, a slave 2 locomotive 4, and a slave 3 locomotive 5. The system is divided into two parts: the first part builds a cloud virtual multi-heading management stage 6, and the second part builds a locomotive asynchronous cooperative control stage 7, which are completed through DMUs. The first stage of each locomotive DMU includes a DMU networking and management module 8, a differentially adaptive cloud management module 9, a wireless link management module 10, and a safe transmission management module 11.

The second stage of each locomotive DMU includes a DMU calculation and cooperative control module 12, a wireless communication transmission module 13, a redundancy management module 14, a locomotive differential control module 15, a traction/brake characteristic control module 16, a fault and safety guide control module 17, and an electrical driving control module 18. The DMU exchanges information with locomotive systems through a communication interface module 19, including obtaining line information and train parameters from a train safety monitoring apparatus LKJ 20 through the communication interface module 19, exchanging information with a train network control and management system TCMS through the communication interface module 19, exchanging information with a locomotive logic control unit LCU 23 through the communication interface module 19, exchanging information with a brake control unit BCU 24 through the communication interface module 19, and exchanging signals with third-party devices 25 through the communication interface module 19.

At the cloud virtual multi-heading management stage as a first stage (i.e. stage I), the first stage of each locomotive includes a DMU networking and management module 8 of a master DMU, a differentially adaptive cloud management module 9, a wireless link management module 10, and a safe transmission management module 11, the DMU of a master locomotive serves as a manager and performs differential management and control at a cloud for remote multi-heading of locomotives, and the first stage implements a networking, marshaling and real-time internal information exchange platform for four locomotives, is controlled by the master locomotive, and solves problems of triggered real-time response of slave locomotives. At the locomotive asynchronous cooperative control stage as a second stage (stage II), the second stage of each locomotive includes a DMU calculation and cooperative control module 12 of the master DMU, a wireless communication data transmission module 13, a redundancy management module 14, a locomotive differential control module 15, a traction/brake control module 16, a fault and safety guide control module 17, and an electrical driving control module 18. The function of the second stage is to implement local asynchronous control on the locomotives, complete cooperative traction operation control for multi-heading of locomotives, and also can easily optimize longitudinal dynamic performance of a running train.

FIG. 1 and FIG. 6 show a locomotive wireless multi-heading remote distributed power traction operation control method and system, where the DMU exchange information with a train network control and management system TCMS 21 of an original locomotive, the train safety operation monitoring apparatus LKJ 20, the locomotive logic control unit LCU 23, the brake control unit BCU 24, and the third-party devices 25 through the communication interface module 19 to obtain state information of the locomotive and control the locomotive through the foregoing devices.

Embodiment 2

Figure 2:
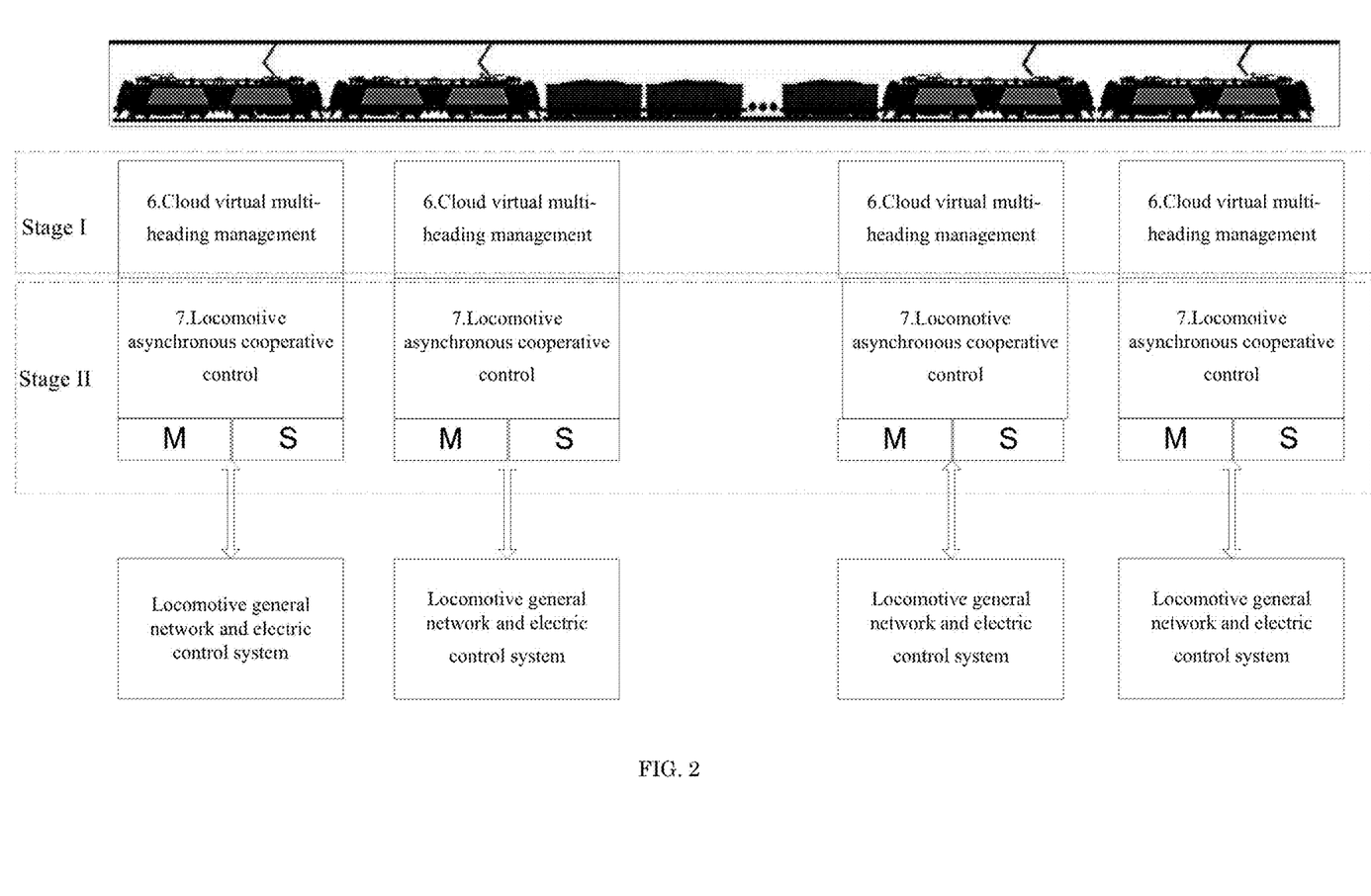
FIG. 2 is a structural block diagram of Embodiment 1 of the present invention.

As shown in FIG. 2, a cloud virtual multi-heading management stage as a first stage (i.e. stage I) builds remote multi-heading networking and real-time information link exchange for four locomotives through DMUs, implements differential management and control on remote multi-heading of locomotives at a cloud, implements a networking, marshaling and real-time internal information exchange platform for four locomotives, is controlled by a master locomotive, and solves problems of triggered real-time response of slave locomotives. At a locomotive asynchronous cooperative control stage as a second stage (stage II), a master DMU of each locomotive implements local asynchronous control on locomotives, and complete cooperative traction operation control for multi-heading locomotives of a combined train. The embodiment of the present invention may also be extended to a traction operation control system for remote wireless multi-heading of two, three, or more than four locomotives.

Embodiment 3

Figure 3:
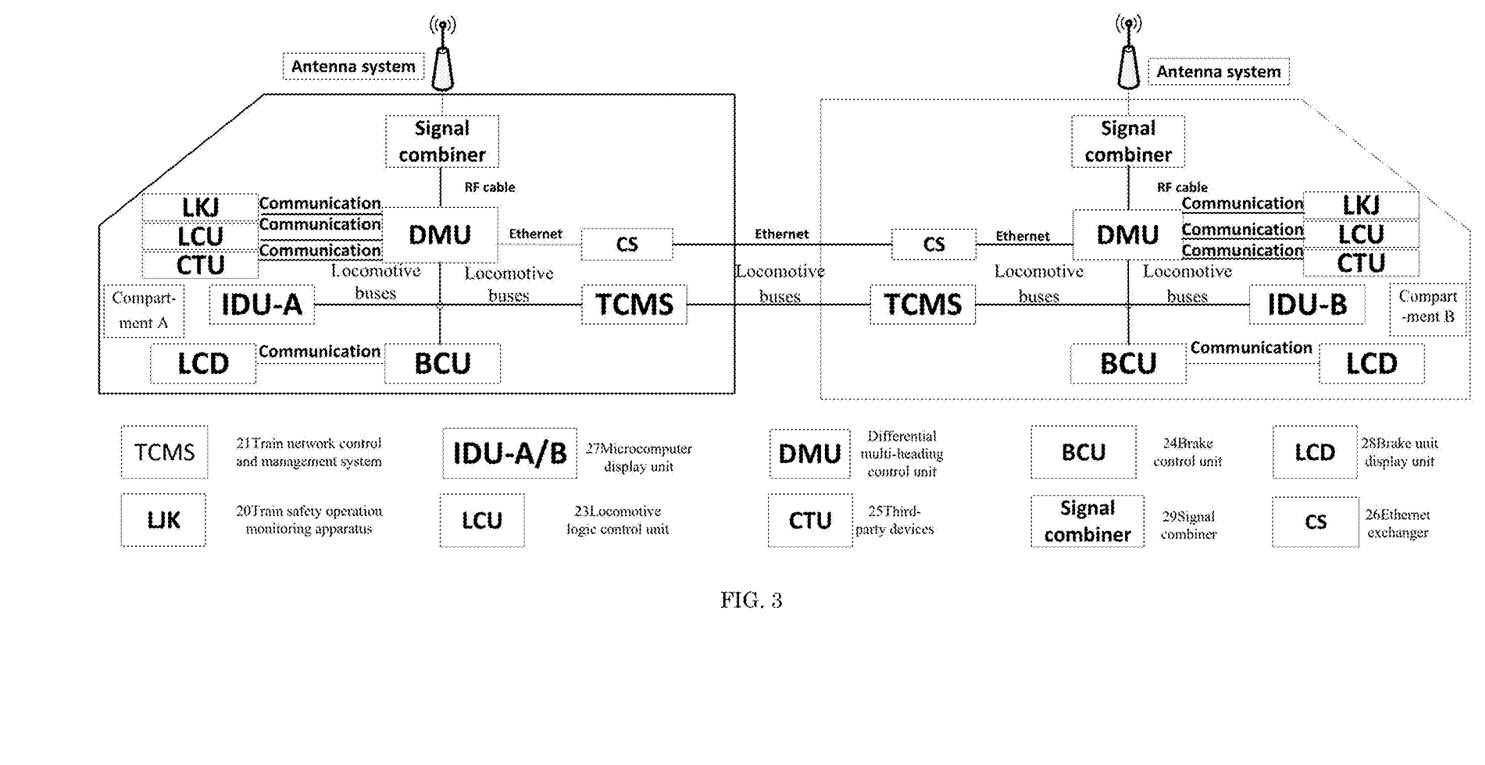
FIG. 3 is a structural block diagram of Embodiment 2 of the present invention.

As shown in FIG. 3, Embodiment 3 of the present invention includes a system topology connection relationship between two internal multi-heading locomotives when the system is implemented on heavy haul locomotives. DMUs of the two locomotives exchange interconnected information through a exchanger module (CS) 26. At initial power-on time, both the DMUs are weak nodes. The DMU operating in the same direction as the master locomotive is defaulted as a master DMU. On this basis, a DMU redundancy control module determines that one of the DMUs obtains a control token and is upgraded to a master DMU for control, and the other DMU is degraded to a redundant DMU for state monitoring. If the master DMU fails and its token is lost, the redundant DMU is automatically upgraded to a master DMU. The DMU further includes a microcomputer display unit module (IDU) 27, a brake unit display module (LCD) 28, and a signal combiner module 29.

Embodiment 4

Figure 4:
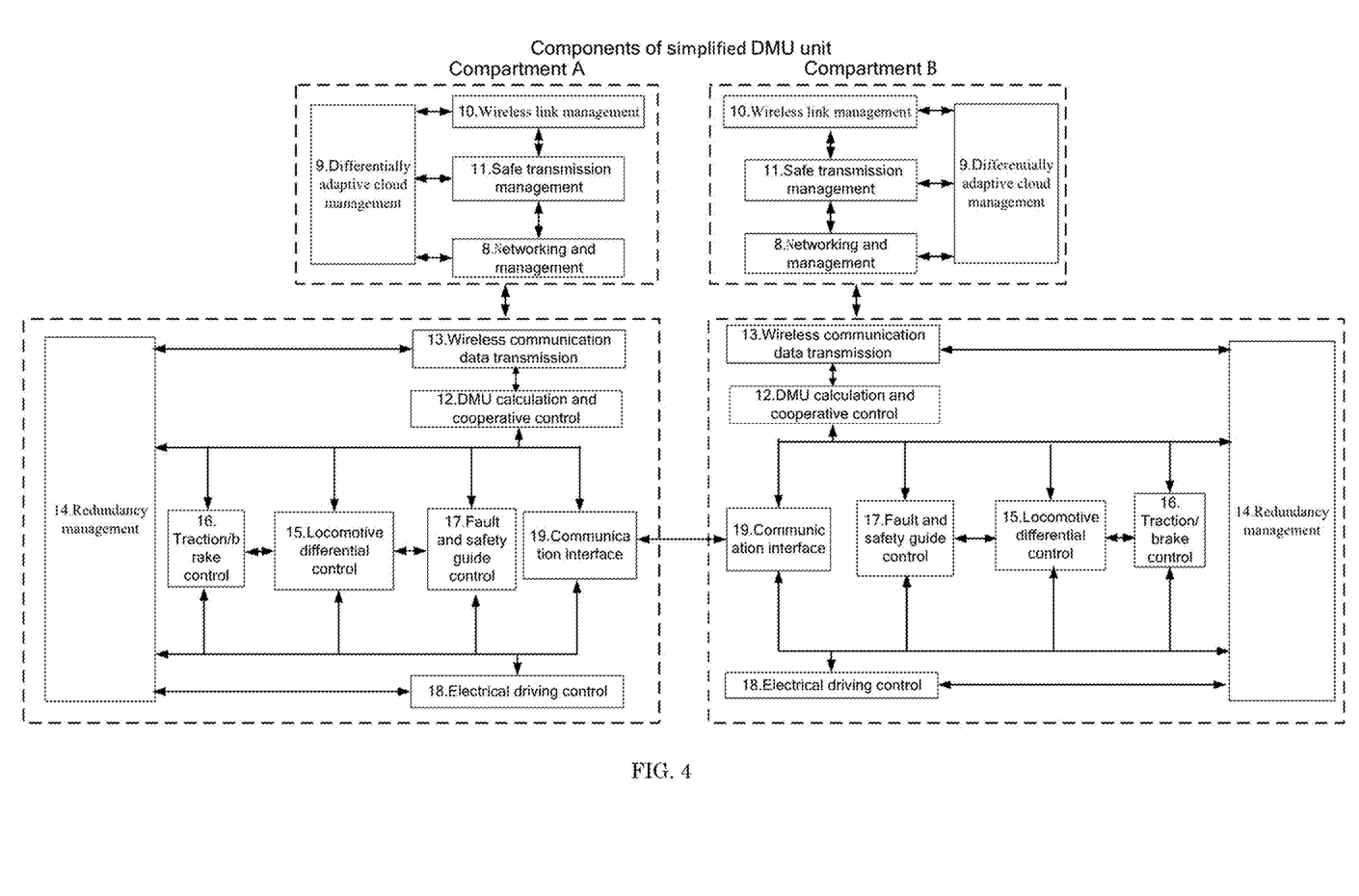
FIG. 4 is a structural block diagram of Embodiment 3 of the present invention.

FIG. 4 shows a connection relationship between internal modules of DMUs of a locomotive wireless multi-heading remote distributed power traction operation control system in Embodiment 4 of the present invention. In FIG. 4, a part of a DMU includes a DMU networking and management module 8, a differentially adaptive cloud management module 9, a wireless link management module 10, and a safe transmission management module 11, which are used to implement differential virtual multi-heading management. The other part includes a DMU calculation and cooperative control module 12, a wireless communication data transmission module 13, a redundancy management module 14, a locomotive differential control module 15, a traction/brake control module 16, a fault and safety guide control module 17, an electrical driving control module 18, and a communication interface 19, which are used to implement asynchronous cooperative traction operation control on a current locomotive. Each locomotive is equipped with two sets of DMUs, one for master control and the other for redundancy. The master control state is marked with M and the redundancy state is marked with S. The two systems are interconnected through communication.

The invention claimed is:

1. A locomotive wireless multi-heading remote distributed power traction operation control system, comprising at least one differential multi-heading control unit disposed on each locomotive, wherein differential multi-heading control units on a plurality of locomotives form a two-stage architecture, wherein the first stage is a cloud differential locomotive wireless multi-heading management stage, at which the differential multi-heading control units of locomotives constitute a virtual differential wireless multi-heading management system, the differential multi-heading control units are initialized after the locomotives are marshaled, a topology table of the differential multi-heading control units is built, and the differential multi-heading control unit of a master locomotive has a management authority and manages each differential multi-heading control unit according to the topology table; and the second stage is a differential locomotive wireless multi-heading control stage, at which the wireless multi-heading control unit of each locomotive obtains control information of the locomotive, state feedback information of the locomotive, operation line data information, and wireless communication information, and the differential multi-heading control unit of the master locomotive processes the control information of the locomotive, the state feedback information of the locomotive, the operation line data information, and the wireless communication information, performs cooperative control on a static logic and a dynamic sequential logic of the locomotives, and uses a state of a state machine as a triggering condition to transfer logic control; the differential multi-heading control unit of each locomotive allocates and adjusts locomotive traction characteristics in real time through a locomotive control system TCMS and an electrical interface by using a set locomotive traction characteristic curve, and corrects coefficients according to a speed set by a driver or a magnitude of traction/brake force to reduce longitudinal force of a train; and the differential multi-heading control unit of the master locomotive exchanges information with the differential multi-heading control units of each slave locomotive.

2. The locomotive wireless multi-heading remote distributed power traction operation control system according to claim 1, wherein the differential locomotive wireless multi-heading control stage communicates with the locomotive control system TCMS for the multi-heading locomotives; and the locomotive control system TCMS completes input/output and control of a locomotive electrical system by receiving instructions from the differential locomotive wireless multi-heading control stage.

3. The locomotive wireless multi-heading remote distributed power traction operation control system according to claim 1, wherein the differential locomotive wireless multi-heading control stage exchanges information with the locomotive control system TCMS through a vehicle wired communication network.

4. The locomotive wireless multi-heading remote distributed power traction operation control system according to claim 1, wherein each locomotive is provided with two differential multi-heading control units.

5. The locomotive wireless multi-heading remote distributed power traction operation control system according to claim 1, wherein the cloud differential locomotive wireless multi-heading management stage comprises:
  a DMU networking and management module, configured to implement real-time and periodic exchange of air data between a plurality of locomotives;
  a differentially adaptive cloud management module, configured to form a group topology table for control applications between the locomotives, translate control and feedback information into a unified information format at a cloud for the differentiation of the locomotives, check whether the traction characteristics of the locomotives meet traction requirements of a heavy haul train, check whether the distribution of the locomotives in the train meets dynamics performance requirements of the train, and match weights of traction/brake characteristics according to the differentiation of the locomotives;
  a wireless link management module, configured to implement real-time communication between the remote locomotives, form communication link management for group control applications between the locomotives, perform data error verification, and perform conversion and control of a link management authority; and
  a safe transmission management module, configured to transmit data safely via an optimized locomotive communication protocol encrypting data frames during encoding.

6. The locomotive wireless multi-heading remote distributed power traction operation control system according to claim 5, wherein the differential locomotive wireless multi-heading control stage comprises:
  a DMU calculation and cooperative control module, configured to implement asynchronous cooperative traction operation control under remote multi-heading of the locomotives;
  a wireless communication data transmission module, configured to complete data exchange with the wireless link management module and communicate with a redundancy management module;
  the redundancy management module, configured to implement authority management of two differential multi-heading control units in a locomotive, wherein the differential multi-heading control unit that obtains a master control authority has an external output function, while the other differential multi-heading control unit is automatically switched to a redundancy module; both the two differential multi-heading control units have information input and calculation functions; the redundancy management module is further configured to monitor the master differential multi-heading control unit; and when the master differential multi-heading control unit is abnormal, the master differential multi-heading control unit automatically loses a master control token, and the redundant differential multi-heading control unit automatically obtains the token and is switched to a master control module;
  a locomotive differential control module, configured to implement locomotive control for different types of locomotives and different control modes, and communicate with the DMU calculation and cooperative control module and an electrical driving control module;
  a traction/brake characteristic control module, configured to match weight coefficients of traction/brake characteristics according to different locomotive models, distribution positions of locomotives in different trains, different line conditions, locomotive operating conditions, and the differentiation of the locomotives, adjust the traction/brake characteristics of each locomotive according to instructions of a driver controller of the master locomotive, and calculate and control the traction/brake characteristics of the locomotives in real time;
  a fault safety guide control module, configured to implement fault diagnosis and safety guide for locomotive multi-heading, and communicate with the DMU calculation and cooperative control module and the electrical driving control module;
  the electrical driving control module, configured to implement signal driving of the locomotive control system TCMS, a BCU brake control unit, and an LCU logic control unit, and communicate with the redundancy management module; and
  a communication interface module, configured to communicate with the TCMS system, the BCU brake control unit, the LCU logic control unit, an LKJ train operation safety monitoring apparatus, and third-party devices, and communicate with the DMU calculation and cooperative control module and the electrical driving control module.

7. A multi-heading locomotive, using the locomotive wireless multi-heading remote distributed power traction operation control system according to claim 6.

8. The multi-heading locomotive according to claim 7, wherein each locomotive comprises two compartments, and each compartment is provided with a differential multi-heading control unit; or each locomotive comprises three compartments, wherein unit sections of two cabs are provided with the differential multi-heading control units; and the two differential multi-heading control units of the same locomotive communicate with each other.

* * * * *